United States Patent [19]
Apple et al.

[11] Patent Number: 6,011,669
[45] Date of Patent: Jan. 4, 2000

[54] PASS THRU MECHANISM FOR TRANSFERRING MAGNETIC TAPE CARTRIDGES BETWEEN AUTOMATED CARTRIDGE LIBRARY SYSTEMS

[75] Inventors: James Lee Apple; Paul Kummli, both of Boulder; Arthur Francis Fry, Westminster, all of Colo.

[73] Assignee: Storage Technology Corporation, Louisville, Colo.

[21] Appl. No.: 09/067,595

[22] Filed: Apr. 27, 1998

[51] Int. Cl.[7] .................................................. G11B 15/68
[52] U.S. Cl. ........................................................ 360/92
[58] Field of Search .............................. 360/92; 369/77.2; 414/749, 786, 331, 277

[56] References Cited

U.S. PATENT DOCUMENTS

| | | | |
|---|---|---|---|
| 3,504,808 | 4/1970 | Carabateas | 214/16.4 |
| 4,779,151 | 10/1988 | Lind et al. | |
| 4,864,438 | 9/1989 | Munro | 360/92 |
| 4,932,826 | 6/1990 | Moy et al. | 414/277 |
| 5,429,470 | 7/1995 | Nicol et al. | 414/331 |
| 5,570,337 | 10/1996 | Dang | 369/192 |
| 5,700,125 | 12/1997 | Falace et al. | 414/276 |
| 5,703,843 | 12/1997 | Katsuyama et al. | |
| 5,742,570 | 4/1998 | Taki et al. | |
| 5,831,957 | 11/1998 | Matsushima | 369/77.2 |
| 5,836,735 | 11/1998 | Yeakley et al. | 414/749 |

FOREIGN PATENT DOCUMENTS 0 276 967 A2   8/1988   European Pat. Off.

*Primary Examiner*—David L. Ometz
*Assistant Examiner*—Angel Castro
*Attorney, Agent, or Firm*—Duft, Graziano & Forest

[57] ABSTRACT

The pass thru mechanism serves to interconnect two juxtaposed automated cartridge library systems and provides an apparatus to obviate the need for complex alignment compensation mechanisms or precise alignment between the juxtaposed automated cartridge library systems. An alignment platform is located at each end of the pass thru mechanism and a repositioning assembly is located midway between the two ends of the pass thru mechanism. The alignment platforms are typically located entirely within the confines of the housing of the automated cartridge library systems and the repositioning assembly is either completely external to the housing of the automated cartridge library systems or only partially included therein. The operation of the alignment platforms and the repositioning assembly are decoupled in that there is no physical connection among these elements or interaction among these elements. A transport belt is provided to be the unifying element in that it picks a magnetic tape cartridge from a first alignment platform, then delivers the magnetic tape cartridge to the repositioning assembly which performs the cartridge rotation function, then places the rotated cartridge on the second alignment platform for access by the second robot mechanism.

13 Claims, 5 Drawing Sheets

6,011,669

PASS THRU MECHANISM FOR TRANSFERRING MAGNETIC TAPE CARTRIDGES BETWEEN AUTOMATED CARTRIDGE LIBRARY SYSTEMS

FIELD OF THE INVENTION

This invention relates to automated cartridge library systems that function to robotically store and retrieve magnetic tape cartridges in a plurality of cartridge storage locations and, in particular, to pass thru mechanism that interconnects two operationally independent automated cartridge library systems to enable the robots contained in the two automated cartridge library systems to exchange magnetic tape cartridges.

PROBLEM

It is a problem in automated cartridge library systems to enable a plurality of independent automated cartridge library systems to operate together in a unified manner. In particular, the typical automated cartridge library system is a self-contained unit that contains a plurality of magnetic tape cartridge storage locations that are serviced by a robot mechanism. The robot mechanism functions to retrieve a magnetic tape cartridge from its assigned magnetic tape cartridge storage location in the automated cartridge library system and load the retrieved magnetic tape cartridge into a designated tape drive for the reading and/or writing of data thereon. When the tape drive is finished with the magnetic tape cartridge, the robot mechanism retrieves the magnetic tape cartridge from the tape drive and returns it to its assigned magnetic tape cartridge storage location.

The automated cartridge library system is completely enclosed by a housing to prevent a user from either interfering with the robot mechanism or being injured by the operation of the robot mechanism. Given the completely enclosed nature of the automated cartridge library system, a cartridge access port is typically provided to enable magnetic tape cartridges to be entered into and retrieved from the automated cartridge library system by the user. The cartridge access port provides an apparatus that receives a magnetic tape cartridge from a user and then presents this magnetic tape cartridge to the robot mechanism for storage in an assigned magnetic tape cartridge storage location. The cartridge access port is designed to protect the user in that it presents an impenetrable barrier to both the user and the robot mechanism to prevent direct contact between the two.

There are numerous cartridge access ports and a typical one is illustrated in U.S. Pat. No. 4,779,151, titled "Robotic Tape Cassette Handling System With Rotary Loading and Unloading Mechanism". This cartridge access port comprises rotatable door located within the library that can be positioned in one of two rotatable states. In a first state, the door presents a plurality of cartridge storage slots to the user to enable the user to input cartridges into the library or retrieve cartridges from the library. In the second rotatable state, the door presents the plurality of cartridge storage slots to the robot mechanism to enable the robot mechanism to receive cartridges into the library or eject cartridges from the library. This cartridge access port is rotatable completely within the library housing and provides the user with a mechanism to input cartridges into the library or retrieve cartridges from the library without having to shut down the library system to access the interior portion thereof.

Another cartridge access port mechanism is disclosed U.S. Pat. No. 4,932,826, titled "Automated Cartridge System". This cartridge access port mechanism includes a plurality of cartridge storage cells for the placement and retrieval of magnetic tape cartridges by both the user and the robot mechanism. The cartridge storage cells are mounted on a door that is hinged in a manner that permits the door to swing outward away from the housing of the automated cartridge library system to expose the array of cartridge storage cells. Also included in this mechanism is an articulated wall segment that closes the opening in the housing when the cartridge access port hinged door is opened. The articulated wall segment prevents the user from accessing the inner portion of the automated cartridge library system and the robot mechanism contained therein. This cartridge access port does not rotate within the library housing as the priority mentioned cartridge access port, but instead pivots away from the housing to provide the user with access to the cartridge storage cells mounted on the cartridge access port.

While the above-noted cartridge access ports serve the needs of the user to input cartridges into the library or retrieve cartridges from the library, such an apparatus is inoperable to enable the robot mechanisms in two juxtaposed automated cartridge library systems to automatically exchange magnetic tape cartridges, independent of the user. Therefore, a unique pass thru mechanism must be provided to interconnect two juxtaposed automated cartridge library systems in a manner to enable a robot mechanism to pass a selected magnetic tape cartridge to the robot mechanism in a juxtaposed automated cartridge library system without the need for user intervention. The ability to automatically exchange magnetic tape cartridges provides a load balancing capability whereby idle tape drives in an automated cartridge library system are accessible by the robot mechanism located in a juxtaposed automated cartridge library system by means of the pass thru mechanism.

The only existing automated cartridge library systems to make use of a pass thru mechanism are those manufactured by Storage Technology Corporation. Such a pass thru mechanism is disclosed in U.S. Pat. No. 4,864,438, titled "Tape Cartridge Movement Management in an Automated Cartridge Library System" and U.S. Pat. No. 4,932,826, titled "Automated Cartridge System". The pass thru mechanism illustrated in these patents comprises a carriage that supports a plurality of magnetic tape cartridge storage slots. The carriage operates on a track, driven by a lead screw mechanism to transport magnetic tape cartridges between two juxtaposed operationally independent automated cartridge library systems. The carriage is mounted on a swivel and presents the magnetic tape cartridges to a first robot in the proper orientation when the carriage is positioned at a first end of its track. However, this cartridge orientation is 180° out of alignment with respect to the second robot mechanism located at the second end of the track. The pass thru mechanism therefore rotates the magnetic tape cartridge prior to reaching the second end of the track to thereby present the magnetic tape cartridge to the second robot mechanism in the proper orientation. This is accomplished by the use of a cam feature that rotates the carriage from its first orientation to its second orientation as the carriage is driven by the lead screw and traverses the track from the first end to the second end. The pass thru mechanism does not include any user protection apparatus as does the cartridge access ports because the user cannot access the pass thru mechanism due to its location between two juxtaposed automated cartridge library systems.

While the above-noted carriage/lead screw mechanism is effective to enable the robot mechanism to exchange magnetic tape cartridges, the architecture of this pass thru mechanism is costly in order to account for any misalignment of the juxtaposed automated cartridge library systems, since the respective ends of the track contained in the pass thru mechanism must align with the robot mechanism in the respective automated cartridge library systems. The automatic mechanical alignment compensation is expensive to accomplish and a simpler, more flexible pass thru mechanism is desirable.

Solution

The above-described problems are solved and a technical advance achieved in the field by the present pass thru mechanism for automated cartridge library systems that serves to interconnect two juxtaposed operationally independent automated cartridge library systems and provides an apparatus to obviate the need for complex alignment compensation mechanisms or precise alignment between the juxtaposed automated cartridge library systems. An alignment platform is located at each end of the pass thru mechanism and a cartridge cradle is located midway between the two ends of the pass thru mechanism. The alignment platforms are typically located entirely within the confines of the housing of the automated cartridge library systems and the cartridge cradle is either completely external to the housing of the automated cartridge library systems or only partially included therein. The operation of the alignment platforms and the cartridge cradle are decoupled in that there is no physical connection among these elements or interaction among these elements. A transport belt is provided to be the unifying element in that it picks a magnetic tape cartridge from a first alignment platform, then delivers the magnetic tape cartridge to the cartridge cradle which performs the cartridge rotation function, then returns the rotated cartridge to the transport belt which transports it to the second alignment platform for access by the second robot mechanism. Thus, the only active elements in this pass thru mechanism are the transport belt that moves a magnetic tape cartridge from one end of the pass thru mechanism to the other end of the pass thru mechanism and the cartridge cradle that rotates the magnetic tape cartridge substantially outside of the confines of the automated cartridge library system. These two active mechanisms are not physically connected to each other but are cooperatively operative to perform the magnetic tape cartridge transportation and rotation functions.

DETAILED DESCRIPTION

Figure 1:
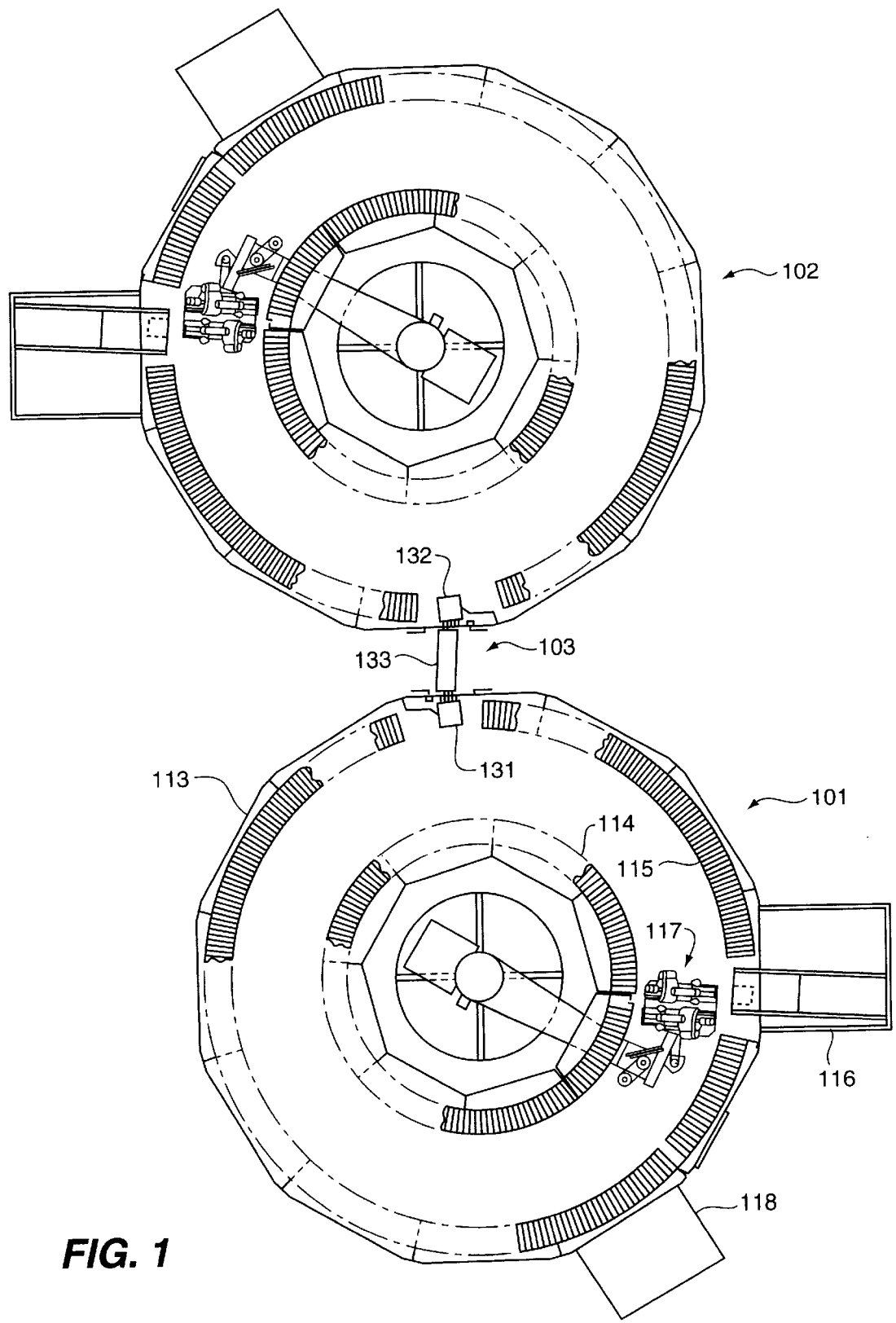
FIG. 1 illustrates in block diagram form a top view of two juxtaposed automated cartridge library systems that are equipped with the present pass thru mechanism for transferring magnetic tape cartridges between automated cartridge library systems.

FIG. 1 illustrates in block diagram form a top view of two juxtaposed automated cartridge library systems 101, 102 that are equipped with the present pass thru mechanism 103 for transferring magnetic tape cartridges between automated cartridge library systems. In particular, the automated cartridge library systems 101, 102 are a well known apparatus, such as the ACS manufactured by Storage Technology Corporation, that comprise an exterior housing 113 of doecahedron shape that encloses an anthromorphic robotic arm mechanism 110 that functions to retrieve magnetic tape cartridges from a plurality of cartridge storage locations 111 in the two concentrically oriented cartridge storage arrays 114, 115. A plurality of tape drives 116 are served by each of the automated cartridge library systems 101, 102 for the reading and writing of data on the magnetic tape cartridges that are loaded therein. Each automated cartridge library system 101, 102 comprises two concentrically arranged cylindrical arrays 114, 115 of magnetic tape cartridge storage locations. A robot arm 110, pivotally rotatable about the center axis of the concentrically arranged cylindrical arrays 114, 115 of magnetic tape cartridge storage locations contains a magnetic tape cartridge retrieval mechanism 117. The magnetic tape cartridge retrieval mechanism 117 is located between the concentrically arranged cylindrical arrays 114, 115 of magnetic tape cartridge storage locations for retrieving and replacing magnetic tape cartridges in the magnetic tape cartridge storage locations, thereby eliminating the need for manual retrieval of the magnetic tape cartridges. The inner and outer cylindrical arrays 114, 115 are arranged to be accessed by the magnetic tape cartridge retrieval mechanism 117 from this common area located between the cylindrical arrays 114, 115. A control unit 118 provides the control circuitry and software to regulate the operation of the robot arm 110. In addition, a plurality of tape drives 116 are mounted on one or more of the sides of the housing 113 to enable the magnetic tape cartridge retrieval mechanism 117 to load magnetic tape cartridges therein.

The pass thru mechanism 103 is connected to and interconnects the two automated cartridge library systems 101, 102 for exchanging magnetic tape cartridges therebetween. The pass thru mechanism 103 comprises first and second alignment platforms 131, 132, located at first and second ends of the pass thru mechanism 103, respectively, and a repositioning assembly 133 located substantially midway between the two alignment platforms 131, 132. These three elements are served by a transport belt that extends from the first end of the pass thru mechanism 103 to the second end of the pass thru mechanism 103.

Architecture of the Pass Thru Mechanism

Figure 2:
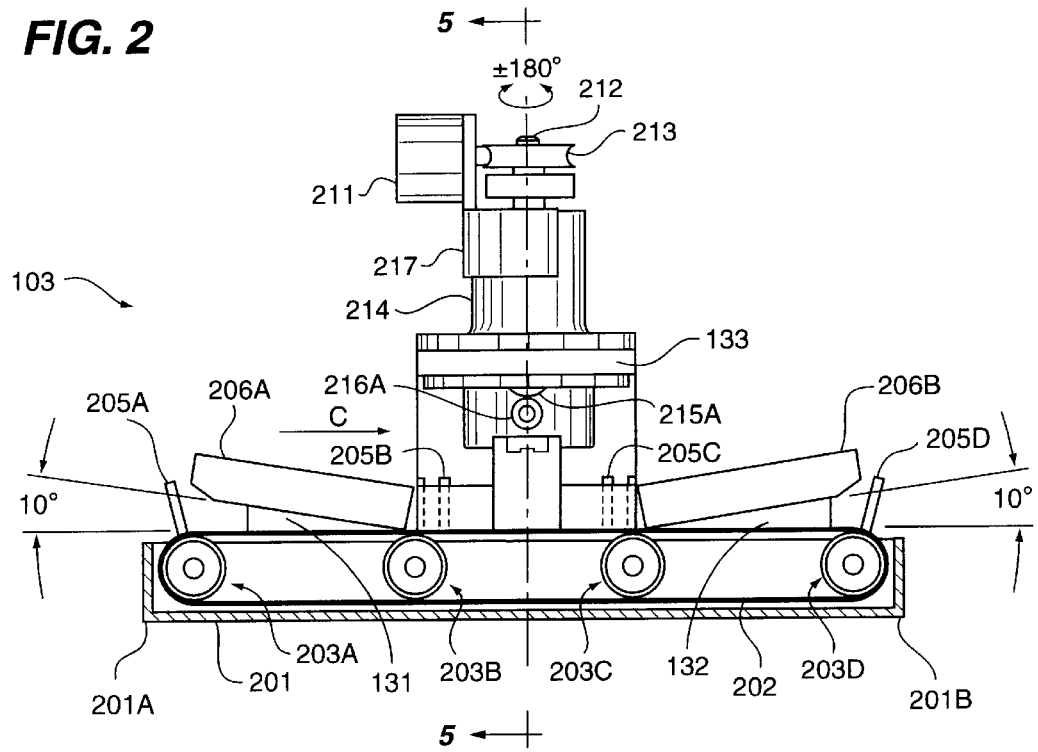
FIGS. 2–4 illustrate top, side and end views, respectively, of the present pass thru mechanism for transferring magnetic tape cartridges between automated cartridge library systems.
Figure 3:
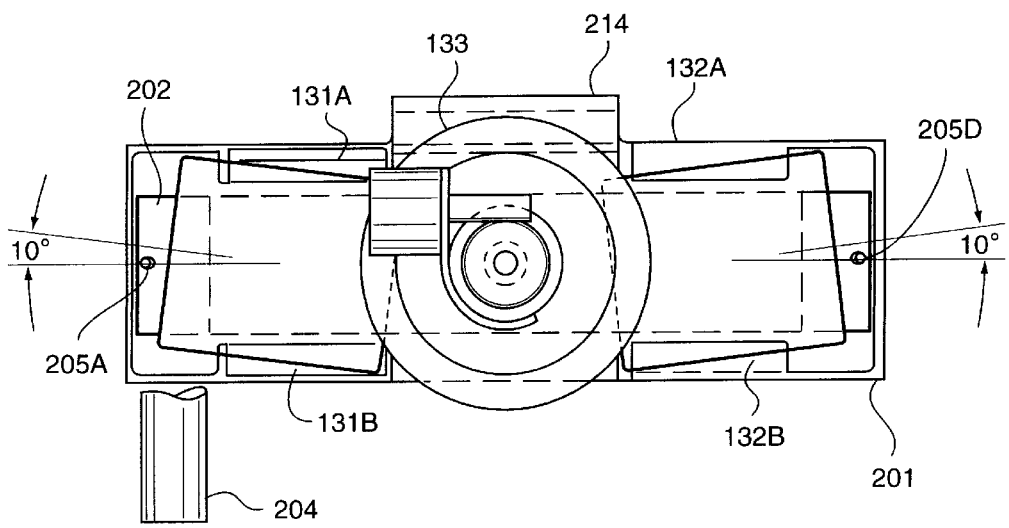
Figure 4:
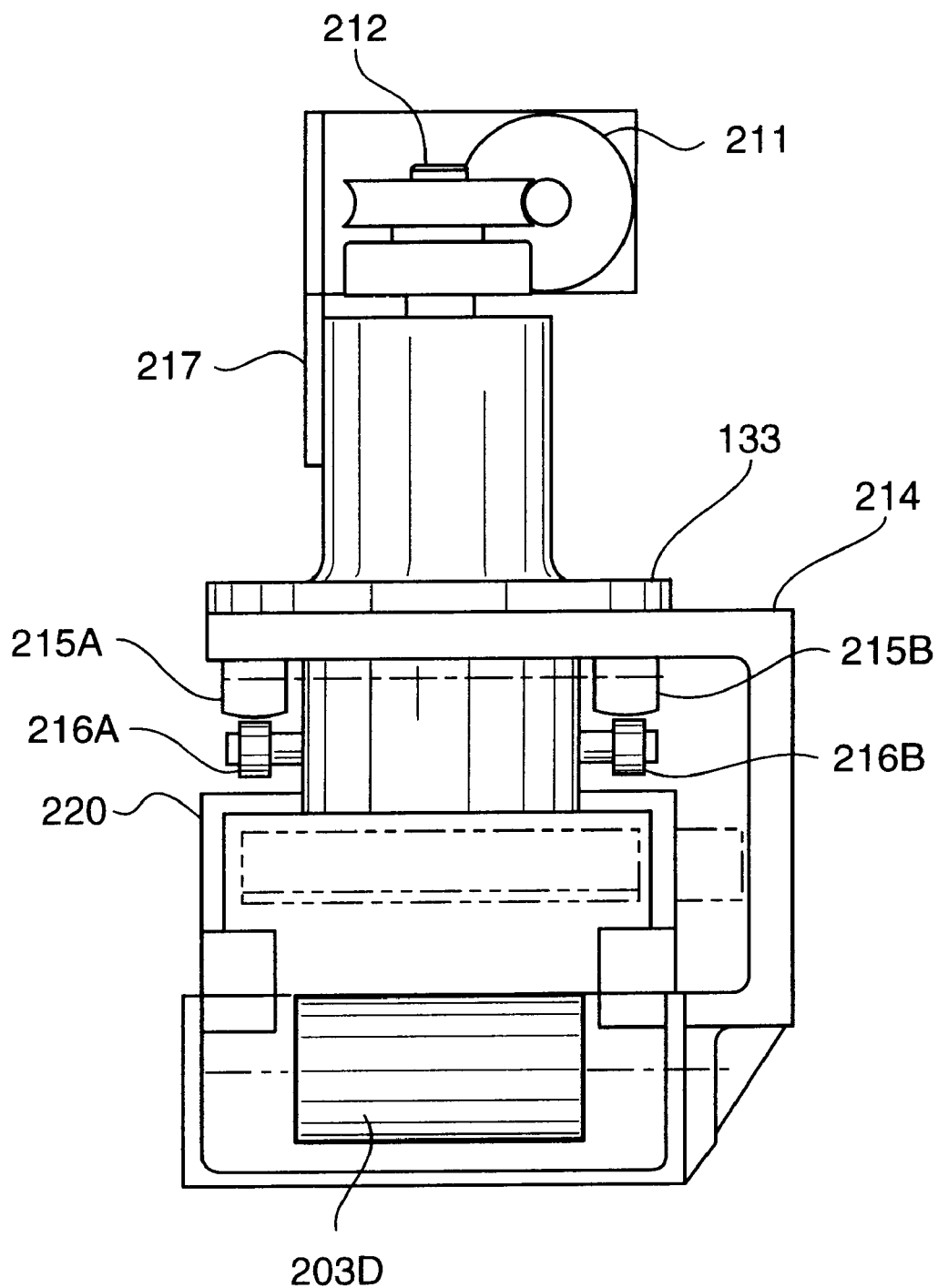
Figure 5:
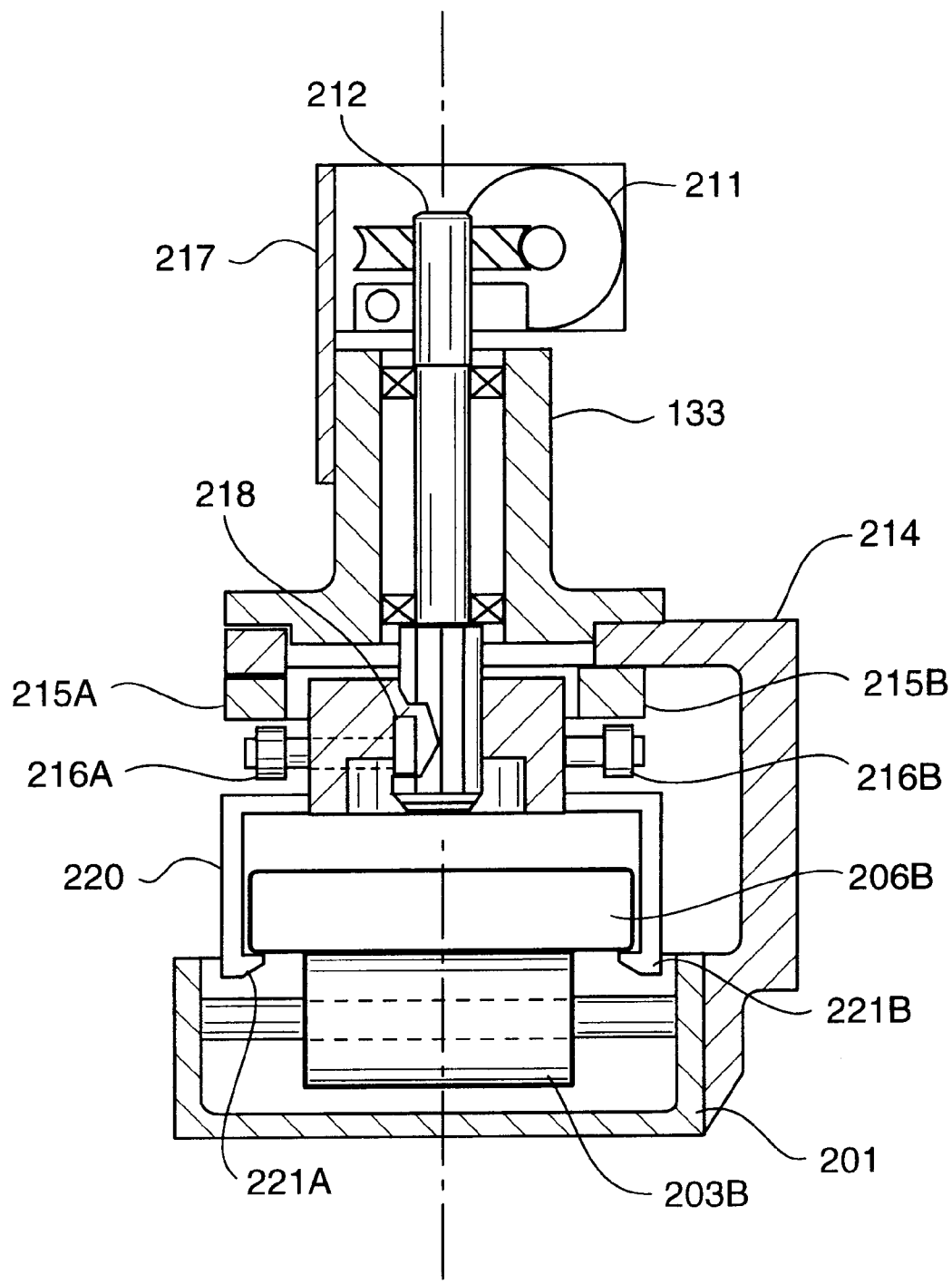
FIG. 5 illustrates a cross section view of the cartridge cradle mechanism of the the present pass thru mechanism for transferring magnetic tape cartridges between automated cartridge library systems.

FIGS. 2–4 illustrate top, side and end views, respectively of the present pass thru mechanism 103 for transferring magnetic tape cartridges between automated cartridge library systems while FIG. 5 illustrates a cross section view of the repositioning assembly 133 through section line A—A of the present pass thru mechanism 103 for transferring magnetic tape cartridges between automated cartridge library systems. The pass thru mechanism 103 comprises a frame 201 to which the various cartridge transport elements of the pass thru mechanism 103 are attached. In particular, a transport belt 202 extends from the first end 201A of the frame 201 to the second end 201B of the frame 201 and is supported by a plurality of rollers 203A–203D to form a closed loop. One of the rollers 203A is a drive roller, driven by a belt drive motor 204. Thus, the belt drive motor 204 functions to rotate the drive roller 203A in a selected one of either a clockwise or counterclockwise direction, causing the transport belt 202 to move in a horizontal direction indicated by the arrow C or the reverse of this direction, respectively. The transport belt 202 includes a plurality of sets of cartridge drive pins 205 that extend outwardly from the surface of the transport belt 202, away from the closed loop formed by the transport belt 202, looping around the rollers 203A–203D. Positioned above the transport belt 202 and located at respective first 201A and second 201B ends of the frame 201 are first 131 and second 132 alignment platforms. These alignment platforms 131, 132 are attached to the frame 201 and oriented on an angle with respect to the transport belt 202 such that a magnetic tape cartridge 206 placed in one of the alignment platforms 131 is directed in a downward direction toward the transport belt 202 and inwardly from the corresponding end 201A of the pass thru mechanism 103. A typical angle of inclination for this purpose corresponds to the angle of inclination of the cartridge storage locations within the automated cartridge library system 100 and would be approximately 10°, such that the magnetic tape cartridge 206 does not slide down on to the transport belt 202, but is movable by the cartridge drive pins 205 with a minimum amount of force. The top surface of the alignment platforms 131,132 comprise a flat low friction surface, having guide edges 131A,B and 132 A,B formed along the two sides of the alignment platform 131, 132 to retain a magnetic tape cartridge 206 that is placed on the alignment platform in a desired orientation. The ends of the alignment platform 131, 132 can include tapered edges, such that a magnetic tape cartridge is funneled into position as it traverses the length of the alignment platform.

Located between the two alignment platforms 131, 132, substantially midway between the alignment platforms 131, 132, is a repositioning assembly 133. The repositioning assembly 133 comprises the mechanism that rotates the magnetic tape cartridge 206 as it traverses the pass thru mechanism 103 to thereby place the magnetic tape cartridge 206 in the proper orientation for picking by the associated robot mechanism. The repositioning assembly 133 includes a housing 214 that encloses and supports the shaft 212 and also further supports the motor mount 217. The repositioning assembly 133 further includes a substantially rectangular U-shaped cartridge cradle 220 open at first and second ends, as well as on the downwardly facing side thereof. Protruding from the edges of the downwardly facing opening are fingers or a lip 221A, 221B that extend from the edge of the opening toward the other side to provide a cartridge lifting surface. The cartridge cradle 220 is positioned above the belt 202 to form a "tunnel" into which the belt 202 transports a magnetic tape cartridge 206. When the magnetic tape cartridge 206 is located within the cartridge cradle 220, the belt 202 is stopped and the cartridge cradle 220 is rotated by a motor 211 to lift the cartridge cradle 220 vertically away from the belt 202 to thereby pick the magnetic tape cartridge 206 off the belt 202 and then rotate the cartridge cradle 220 and magnetic tape cartridge 206 by 180°. The rotary motor 211 drives a worm drive 212 that is connected to the cartridge cradle 220 by a shaft 212, with a plurality of cam rollers 216A, 216B attached thereto. The rotation of the shaft 212 causes the cam rollers 216A, 216B to encounter corresponding cam surfaces 215A, 215B that raises the cartridge cradle 220 in response to the force exerted on the cartridge cradle 220 by spring 218 as the cartridge cradle 220 is rotated and for the duration of the magnetic tape cartridge repositioning.

The alignment platforms 131, 132 are typically located entirely within the confines of the housing 113 of the automated cartridge library systems 101, 102 and the repositioning assembly 133 is either completely external to the housing 113 of the automated cartridge library systems 101, 102 or only partially included therein. In addition, while the magnetic tape cartridge 206 rests in the alignment platform 131 or 132, no part of the magnetic tape cartridge 206 extends into the cartridge cradle 220. The operation of the alignment platforms 131, 132 and the repositioning assembly 133 are decoupled in that there is no physical connection among these elements of interaction among these elements. The transport belt 202 is the unifying element in that it picks a magnetic tape cartridge from a first alignment platform 131, then delivers the magnetic tape cartridge to the repositioning assembly 133 which performs the cartridge rotation function, then transports the rotated cartridge to the second alignment platform 132, where the transport belt 202 places it on the second alignment platform 132 for access by the second robot mechanism. Thus, the only active elements in this pass thru mechanism are the transport belt 202 that moves a magnetic tape cartridge from one end of the pass thru mechanism to the other end of the pass thru mechanism and the repositioning assembly 133 that rotates the magnetic tape cartridge outside of the confines of the automated cartridge library systems 101, 102. These two active mechanisms are not physically connected to each other but are cooperatively operative to perform the magnetic tape cartridge transportation and rotation functions.

Operation of the Pass Thru Mechanism

Figure 6:
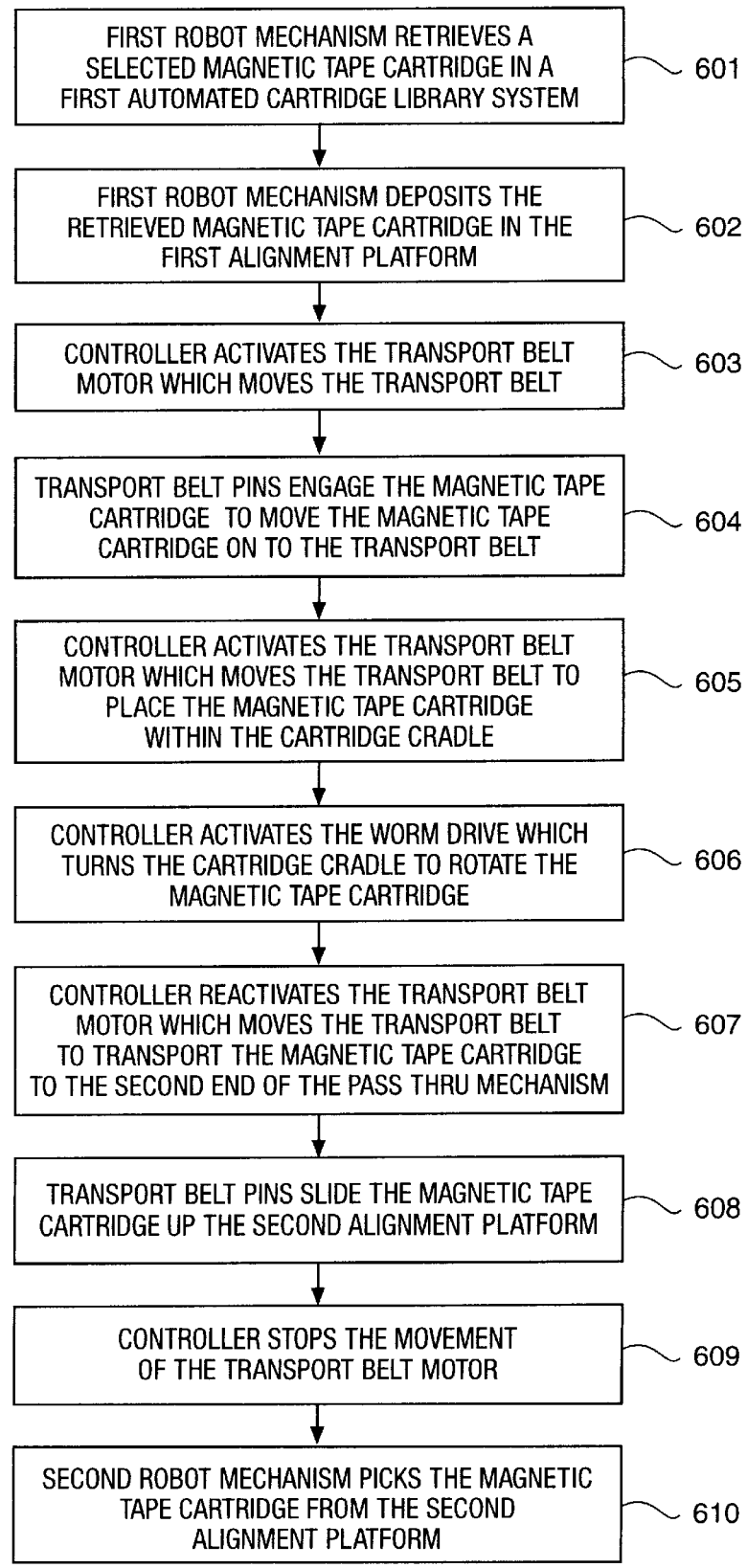
FIG. 6 illustrates in flow diagram form the operational steps taken by the present pass thru mechanism for transferring magnetic tape cartridges between automated cartridge library systems.

FIG. 6 illustrates in flow diagram form the operational steps taken by the present pass thru mechanism 103 for transferring magnetic tape cartridges between automated cartridge library systems 101, 102. At step 601, a first robot mechanism retrieves a selected magnetic tape cartridge from its assigned magnetic tape cartridge storage location in a first of two automated cartridge library systems 101. The first robot mechanism transports the retrieved magnetic tape cartridge to the pass thru mechanism 103 and at step 602 deposits the retrieved magnetic tape cartridge in the first alignment platform 131 of the pass thru mechanism 103. The controller 118 of the automated cartridge library system 101 at step 603 activates the transport belt motor 204 which begins to rotate the transport belt 202 in a clockwise direction (as shown in FIG. 2). At step 604, the transport belt 202, through its rotation, engages the magnetic tape cartridge 206 located in the first alignment platform 131 by means of the cartridge drive pins 205 that are mounted on the transport belt 202, which cartridge drive pins 205 move the magnetic tape cartridge 206 from the first alignment platform 131 on to the transport belt 202. The magnetic tape cartridge 206 is transported by the transport belt 206 to the cartridge cradle 220 where at step 605 the controller 118 stops movement of the transport belt 202 such that the magnetic tape cartridge 206 is located within the cartridge cradle 220. At step 606, the controller 118 activates the repositioning assembly motor 211 to lift the magnetic tape cartridge 206 off the transport belt 202, rotate the magnetic tape cartridge 180°, then replace the rotated magnetic tape cartridge 206 on the transport belt 202. At step 607 the controller 118 reactivates the transport belt motor 204, which again rotates the transport belt 202 in a clockwise direction to transport the magnetic tape cartridge 206 to the second end 201B of the pass thru mechanism 103. At step 608 the transport belt 202, with its cartridge drive pins 205, slides the magnetic tape cartridge 206 up the second alignment platform 132 until it is located entirely on the alignment platform 132. At step 609, the controller 118 stops the movement of the transport belt motor 204 and the second robot mechanism at step 610 picks the magnetic tape cartridge 206 from the second alignment platform 132 for transport to a selected destination within the second automated cartridge library system 102.

Summary

The pass thru mechanism serves to interconnect two juxtaposed automated cartridge library systems and provides an alignment platform at each end of the pass thru mechanism and a repositioning assembly is located midway between the two ends of the pass thru mechanism. The alignment platforms are typically located entirely within the confines of the housing of the automated cartridge library systems and the repositioning assembly is either completely external to the housing of the automated cartridge library systems or only partially included therein. A transport belt is provided to be the unifying element in that it picks a magnetic tape cartridge from a first alignment platform, then delivers the magnetic tape cartridge to the repositioning assembly which performs the cartridge rotation function, then places the rotated cartridge on the second alignment platform for access by the second robot mechanism.

What is claimed:

1. In two juxtaposed automated cartridge library systems for robotically storing and retrieving a plurality of magnetic tape cartridges stored therein, a pass thru apparatus connected to a first and a second of said two juxtaposed automated cartridge library systems, for automatically transporting magnetic tape cartridges between said first and said second of said two juxtaposed automated cartridge library systems, comprising:

first and second cartridge receiving means, fixedly located within said first and said second of said two juxtaposed automated cartridge library systems, respectively, for receiving a selected magnetic tape cartridge deposited therein by a robot mechanism operational in a corresponding one of said first and said second of said two juxtaposed automated cartridge library systems;

means fixably mounted to said pass through apparatus for rotating said selected magnetic tape cartridge;

a transport belt means for transporting said selected magnetic tape cartridge from said first cartridge receiving means to said means for rotating and thence to said second cartridge receiving means; and means for coordinating operation of said means for rotating and said transport belt means for transporting to automatically transport said selected magnetic tape cartridge between said first and said second of said two juxtaposed automated cartridge library systems.

2. The pass thru apparatus of claim 1 wherein said first and second cartridge receiving means comprises:

platform means for providing a magnetic tape cartridge receiving aperture bounded on only two opposing sides by magnetic tape cartridge guides, and oriented to enable a magnetic tape cartridge placed in said platform means to be relocated to said means for transporting.

3. The pass thru apparatus of claim 2 wherein said transport belt means is located immediately below said first and second cartridge receiving means and forms a closed loop from said first cartridge receiving means to said second cartridge receiving means, for transporting said selected magnetic tape cartridge from said first cartridge receiving means to said second cartridge receiving means; and said transport belt means further comprises:

cartridge drive means, affixed to said transport belt means, for engaging said selected magnetic tape cartridge when placed in said first cartridge receiving means to transport said selected magnetic tape cartridge from said first cartridge receiving means into said second cartridge receiving means as said transport belt means moves horizontally.

4. The pass thru apparatus of claim 3 wherein said means for transporting further comprises:

drive means for causing linear movement of said transport belt means from said first cartridge receiving means to said second cartridge receiving means.

5. The pass thru apparatus of claim 4 wherein said means for transporting further comprises:

means for activating said drive means to move said transport means in either of two directions: from said first cartridge receiving means into said second cartridge receiving means, and from said second cartridge receiving means into said first cartridge receiving means.

6. The pass thru apparatus of claim 1 wherein said means for rotating comprises:

cartridge cradle means for receiving a magnetic tape cartridge from said means for transporting;

cam and roller means for lifting said cartridge cradle means and an included magnetic tape cartridge from said means for transporting; and means for rotating said cartridge cradle means 180°.

7. The pass thru apparatus of claim 1 wherein said means for rotating comprises:

means, located substantially midway between said first and second cartridge receiving means, for receiving a magnetic tape cartridge from said means for transporting.

8. The pass thru apparatus of claim 7 wherein said means for rotating further comprises:

cam and roller means for lifting said means for receiving a magnetic tape cartridge from said means for transporting and an included magnetic tape cartridge from said means for transporting; and means for rotating said cartridge cradle means 180°.

9. The pass thru apparatus of claim 7 wherein said means for coordinating comprises:

means for activating said means for rotating only when said means for transporting is not operating.

10. The pass thru apparatus of claim 1 wherein said means for rotating comprises:

means, located substantially external to said two juxtaposed automated cartridge library systems, for receiving a magnetic tape cartridge from said means for transporting.

11. A method of automatically transporting magnetic tape cartridges between a first and a second one of two juxtaposed automated cartridge library systems that robotically store and retrieve said magnetic tape cartridges stored therein, the method comprising:

receiving a selected magnetic tape cartridge from said first one of said two juxtaposed automated cartridge library systems;

transporting said selected magnetic tape cartridge to a cartridge cradle;

rotating said selected magnetic tape cartridge in said cartridge cradle; and transporting said selected magnetic tape cartridge from said cartridge cradle to a second one of said two juxtaposed automated cartridge library systems, wherein the step of transporting said selected magnetic tape cartridge to said cartridge cradle and the step of transporting said selected magnetic tape cartridge from said cartridge cradle to said second one of said two juxtaposed automated cartridge library systems further comprisrs transporting said selected magnetic tape cartridge on a conveyor belt.

12. The method of claim 11, wherein said rotating step further comprises the steps of:

receiving said selected magnetic tape cartridge in said cartridge cradle;

lifting said cartridge cradle and said selected magnetic tape cartridge from said conveyor belt;

rotating said selected magnetic tape cartridge 180 degrees; and lowering said cartridge cradle and said selected magnetic tape cartridge back down onto said conveyor belt.

13. The method of claim 12, wherein said rotating step further comprises:

stopping said conveyor belt before lifting said cradle and said selected magnetic tape cartridge; and starting said conveyor belt after lowering said cartridge cradle and said selected magnetic tape cartridge back down onto said conveyor belt.

* * * * *